(12) United States Patent
Sutter et al.

(10) Patent No.: US 8,728,433 B2
(45) Date of Patent: May 20, 2014

(54) PROCESSING OF MONOLAYER MATERIALS VIA INTERFACIAL REACTIONS

(75) Inventors: Peter Werner Sutter, Westhampton Beach, NY (US); Eli Anguelova Sutter, Westhampton Beach, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 12 days.

(21) Appl. No.: 13/468,592

(22) Filed: May 10, 2012

(65) Prior Publication Data

US 2012/0288433 A1    Nov. 15, 2012

Related U.S. Application Data

(60) Provisional application No. 61/484,752, filed on May 11, 2011.

(51) Int. Cl.
  *C09C 1/56*    (2006.01)
(52) U.S. Cl.
  USPC .......................................... 423/460; 423/448
(58) Field of Classification Search
  USPC ................................................ 423/448, 460
  See application file for complete search history.

(56) References Cited

U.S. PATENT DOCUMENTS

2010/0255984 A1    10/2010   Sutter et al.

OTHER PUBLICATIONS

Growth Mechanism of Graphene on Ru(0001) and O2 Adsorption on the Graphene/Ru(0001) Surface Hui Zhang, Qiang Fu, Yi Cui, Dali Tan, and Xinhe Bao The Journal of Physical Chemistry C 2009 113 (19), 8296-8301.*
Riedl et al. "Quasi-Free-Standing Epitaxial Graphene on SiC Obtained by Hydrogen Intercalation".*
Webelements. "WebElements Periodic Table of the Elements | Ruthenium | physical properties". <http://www.webelements.com/ruthenium/physics.html> Accessed Aug. 21, 2012. 1993.*

(Continued)

*Primary Examiner* — Stanley Silverman
*Assistant Examiner* — Richard M Rump
(74) *Attorney, Agent, or Firm* — Dorene M. Price; Lars O. Husebo

(57) ABSTRACT

A method of forming and processing of graphene is disclosed based on exposure and selective intercalation of the partially graphene-covered metal substrate with atomic or molecular intercalation species such as oxygen ($O_2$) and nitrogen oxide ($NO_2$). The process of intercalation lifts the strong metal-carbon coupling and restores the characteristic Dirac behavior of isolated monolayer graphene. The interface of graphene with metals or metal-decorated substrates also provides for controlled chemical reactions based on novel functionality of the confined space between a metal surface and a graphene sheet.

8 Claims, 10 Drawing Sheets

(56) References Cited

OTHER PUBLICATIONS

Chemistry under Cover: Tuning Metal-Graphene Interaction by Reactive Intercalation Peter Sutter, Jerzy T. Sadowski, and Eli A. Sutter Journal of the American Chemical Society 2010 132 (23), 8175-8179.*

Riedl, C., et al. "Quasi-free-standing epitaxial graphene on SiC obtained by hydrogen intercalation." Physical review letters 103.24 (2009): 246804.*

Berger, C., et al., "Ultrathin Epitaxial Graphite: 2D Electron Gas Properties and a Route Toward Graphene-Based Nanoelectronics," *Journal of Physical Chemistry B*, vol. 108, pp. 19912 to 19916, 2004.

Dresselhaus, M., et al., "Intercalation Compounds of Graphite," *Advances in Physics*, vol. 51, No. 1, pp. 1-186, 2002.

Geim, A., et al., "The Rise of Graphene," *Nature Materials*, vol. 6, pp. 183-191, 2007.

Geim, A., et al., "Graphene: Exploring Carbon Flatland," *Physics Today*, vol. 60, No. 8, pp. 35-41, 2007.

Oshima, C., et al., "Ultra-Thin Epitaxial Films of Graphite and Hexagonal Boron Nitride on Solid Surfaces," *Journal of Physics: Condensed Matter*, vol. 9, No. 1, pp. 1-20, 1997.

Nagashima, A., et al., "Electronic States of the Pristine and Alkali-Metal-Intercalated Monolayer Graphite/Ni(111) Systems," *Physical Review B*, vol. 50 No. 23, pp. 17487 to 17496, 1994.

Reidl, C., et al., "Quasi-Free-Standing Epitaxial Graphene on SiC Obtained by Hydrogen Intercalation," *Physical Review Letters*, vol. 103, No. 24, pp. 246804-1 to 246804-4, 2009.

Sutter, E., et al., "Graphene Growth on Polycrystalline Ru Thin Films," *Applied Physics Letters*, vol. 95, pp. 133109-1 to 133109-3, 2009.

Sutter, E., et al., "Monolayer Graphene as Ultimate Chemical Passivation Layer for Arbitrarily Shaped Metal Surfaces," *Carbon*, vol. 48, pp. 4414 to 4420, 2010.

Sutter, P., et al., "Epitaxial Graphene on Ruthenium," *Nature Materials*, vol. 7, pp. 406-411, 2008.

Sutter, P., et al., "Chemistry Under Cover: Tuning Metal-Graphene Interaction by Reactive Intercalation," *Journal of the American Chemical Society*, vol. 132, No. 23, pp. 8175 to 8179, 2010, and supplementary material pp. S-1 to S-7, [online] [retrieved Oct. 18, 2013] from the internet <URL: http://pubs.acs.org/doi/suppl/10.1021/ja102398n>.

Sutter, P., et al., "Graphene Growth on Epitaxial Ru Thin Films on Sapphire," *Applied Physics Letters*, vol. 97, No. 21, pp. 213101-1 to 213101-3, 2010.

Varykhalov, A., et al., "Electronic and Magnetic Properties of Quasifreestanding Graphene on Ni," *Physical Review Letters*, vol. 101, pp. 157601-1 to 157601-4, 2008.

Zhang, H., et al., "Growth Mechanism of Graphene on Ru(0001) and $O_2$ Adsorption on the Graphene/Ru(0001) Surface," *Journal of Physical Chemistry C*, vol. 113, No. 19, pp. 8296 to 8301, 2009.

* cited by examiner

PROCESSING OF MONOLAYER MATERIALS VIA INTERFACIAL REACTIONS

CROSS-REFERENCE TO A RELATED APPLICATION

This application claims the benefit under 35 U.S.C. 119(e) of U.S. Provisional Application No. 61/484,752 filed on May 11, 2011, the content of which is incorporated herein in its entirety.

STATEMENT OF GOVERNMENT LICENSE RIGHTS

This invention was made with Government support under contract number DE-AC02-98CH10886, awarded by the U.S. Department of Energy. The Government has certain rights in the invention.

FIELD

This relates generally to the processing of monolayer graphene-based materials. In particular, this relates to the processing of large-area, structurally perfect monolayer graphene domains on metal or metal-decorated substrates via interfacial reactions. This further relates to the utilization of graphene layers in complex chemical reactions in a confined space between the graphene layer and the metal or metal-decorated substrate. This also relates to the utilization of the graphene layer(s) in electronic devices, such as sensors, catalysts, or for mechanical purposes.

BACKGROUND

Monolayer materials, such as graphene, are materials with great potential for electronics and other future carbon-based device architectures. Graphene is the two-dimensional (2D) form of crystalline carbon. It is a single atomic sheet of $sp^2$-bonded carbon arranged in a honeycomb lattice extending in a single plane. As illustrated in FIGS. 1A-1D, graphene is the building block for the entire family of graphitic materials. For instance, graphene formed into a ball (see FIG. 1B) results in a carbon fullerene (buckyball); formed into a tube (see FIG. 1C) results in a carbon nanotube; and stacked at least ten layers high (see FIG. 1D), the graphene transforms into bulk graphite.

In fact, by stacking more and more graphene layers on top of each other, the material's properties change dramatically. A single layer of graphene exhibits a quantum staircase in Hall conductivity and ballistic transport, i.e., its charge carriers behave as massless Dirac fermions: charge carriers in the single layer can travel thousands of interatomic distances without scattering. Nano scale ribbons of graphene exhibit quantum confinement, and the capability for single-molecule gas detection. Graphene's physical properties are equally impressive. Measurements probing the intrinsic strength of a sheet of graphene reveal that it is the strongest known material. At two layers thick, graphene is still a zero-gap semiconductor exhibiting the quantum Hall effect. But, unlike single-layer graphene, double-layer graphene lacks a first "step" in the quantum staircase. For three or more graphene layers, however, the electronic properties begin to diverge, ultimately approaching the 3D limit of bulk carbon at about ten layers in thickness and more appropriately referred to as graphite.

One distinct advantage of graphene lies in its 2D nature, so that the drive current of a graphene device, in principle, can be easily scaled up by increasing the device channel width. This width scaling capability of graphene is of great significance for realizing high-frequency graphene devices with sufficient drive current for large circuits and associated measurements. Furthermore, the planar graphene allows for the fabrication of graphene devices and integrated circuits utilizing well-established planar processes in the semiconductor industry. A review of graphene is provided, for example, by A. K. Geim, et al. in "The Rise of Graphene," *Nature Materials* 6, 183 (2007) and in "Graphene: Exploring Carbon Flatland," *Physics Today*, 60, p. 35 (2007) each of which, along with the references cited therein, is incorporated by reference in its entirety as if fully set forth in this specification.

These remarkable properties make graphene suitable for a wide variety of applications. Potential applications in electronics include use of graphene as a new channel material for field-effect transistors (FETs) and as a conductive sheet in the fabrication of single-electron transistor (SET) circuitry. Another potential application is graphene-based composite materials in which a graphene powder is dispersed within a polymer matrix. Graphene powder may also find applications in batteries, as field emitters in plasma displays, or as a catalyst due to its extraordinarily high surface area. Single graphene sheets have exceptionally low-noise electronic characteristics, thereby lending the possibility of their use as probes capable of detecting minuscule changes in external charge, magnetic fields, or mechanical strain.

Despite the extraordinary potential of graphene, realization of practical applications which exploit its unique properties requires the development of reliable methods for fabricating large-area, single-crystal, and defect-free graphene domains. Recent attempts to produce monolayer and/or few-layer graphene have involved, for example, mechanical exfoliation of graphite crystals, thermal decomposition of silicon carbide (SiC) at elevated temperatures, reduction of graphene oxide in hydrazine, and epitaxial growth on transition metal surfaces. However, it continues to be a challenge to efficiently and reproducibly form large (>100 μm) single-crystal domains in quantities sufficient for large-scale fabrication.

For instance, chemical exfoliation involves inserting ("intercalating") molecules into bulk graphite in order to separate the crystalline planes into individual graphene layers. The benefit of this technique is its facile chemical approach. The problem, however, is that even after the intercalating molecules are removed from the mixture, the resultant carbon compounds are present in a "sludge," which contains both restacked and scrolled graphene sheets. (See M. S. Dresselhaus & G. Dresselhaus, *Adv. Phys.*, 51, 1-186, (2002), incorporated herein by reference in its entirety.) Chemical epitaxy, on the other hand, offers the solution to graphene's large-scale integration challenge. In one version of the method, graphene is grown via chemical vapor deposition (CVD) of hydrocarbons deposited on a metal substrate. But, the presence (or remaining residue) of the metal substrate used in the CVD method might not be compatible with electronic fabrication. In contrast to the CVD method, the thermal decomposition method begins with a semiconducting SiC substrate, which is heated to over 1200° C. until the silicon begins to sublime, at which point the remaining carbon on top of the substrate nucleates into graphitic film. The resultant graphene/SiC sample can then be mounted on a silicon substrate for device integration. This thermal decomposition method can achieve few-layer graphene that exhibits high-mobility charge transport. This method, however, requires high-temperature vacuum processing. Consequently, the formation of graphene domains with uniform thicknesses and length scales sufficient for practical applications remains a challenge. (See C. Berger et al., *J. Phys. Chem. B* 108, pp. 19912-19916, (2004), incorporated herein by reference in its entirety.) One approach to epitaxially grow the graphene on the ruthenium (Ru) transition metal that avoids the shortcomings noted above is described in U.S. Pat. Pub. No. 2010/0255984 to Sutter et al.

However, while epitaxial growth on transition metal surfaces is key to realizing large-scale graphene growth, forming conventional and spin-polarizing device contacts, and accessing functionalities such as magnetism and superconductivity, as well as having important implications for transition-metal surface chemistry and catalysis in the presence of graphitic carbon, the method also results in a strong interfacial interaction of transition metal with graphene that suppresses the characteristic linear $\pi$ bands of its electronic structure. This suppression hinders the rise of the high-mobility massless Dirac quasi-particles.

Efforts to change the graphene-transition metal interaction have largely focused on intercalation of metal atoms and, recently, hydrogen (For example, see Varykhalov, A. et al., *Phys. Rev. Lett.*, 101, p. 157601 (2008); Oshima, C. and Nagashima, A., *J. Phys: Condens. Matter*, 9, pp. 1-20 (1997); Nagashima, A. et al., *Phys. Rev. B*, 50, pp. 17487-17495 (1994); and Biedl, C. et al., *Phys. Rev. Lett.*, 103 p. 246804 (2009); each incorporated herein by reference in its entirety.)

Thus, despite the extraordinary potential of graphene, realization of practical applications that exploit its unique properties requires the development of reliable methods for fabricating large-area, single-crystal, and defect-free graphene domains that can be effectively lifted off the metal substrate despite a strong metal-carbon coupling and thereby restore the characteristic linear $\pi$ bands that give rise to high-mobility massless Dirac quasi-particles in the monolayer graphene.

SUMMARY

The complex behavior induced by atomic or molecular intercalation species exposure of partially graphene-covered metal has important implications for the processing of graphene for device applications as well as for transition metal surface chemistry and catalysis in the presence of graphitic carbon. Growth on transition metals has become one of the leading contenders for large-scale graphene synthesis. It is commonly accepted that for applications in electronics, the graphene needs to be transferred from the growth substrate to an insulating support. Thus, a novel method of forming and processing of graphene is provided based on exposure and selective intercalation of the partially graphene-covered metal substrate with atomic or molecular intercalation species such as oxygen ($O_2$) and/or nitrogen oxide ($NO_2$). In one embodiment, the process of intercalation lifts the strong metal-carbon coupling and restores the characteristic Dirac behavior of isolated monolayer graphene.

A method of growing and processing graphene includes a step of epitaxially depositing a layer of carbon based material on a surface of a metal to form a layer of graphene as described in U.S. Pat. Pub. No. 2010/0255984 to Sutter et al., which is incorporated herein by reference in its entirety. In this embodiment, the metal preferably includes, but is not limited to, any transition metal or alloy that exhibits a large change in C solubility with changing temperature. For example, the transition metal may be selected from ruthenium (Ru), nickel (Ni), platinum (Pt), iridium (Ir), or copper (Cu), while ruthenium's (0001) crystal surface is preferred. A detailed description of the process for preparing a monolayer graphene on the surface of the Ru(0001) is described in Sutter, P. W., Flege, J. I., and Sutter, E. A., "Epitaxial graphene on ruthenium," *Nat. Mater.*, 7, pp. 406-411 (2008) (hereinafter "Sutter 2008"), which is incorporated herein by reference in its entirety. In another embodiment a surface template for graphene growth may be provided by a suitable transition metal foil or a transition metal layer formed on a supporting substrate.

The method of growing and processing the graphene further includes steps of exposing the partially covered surface of the metal, e.g., Ru(0001), to an ambient gas, e.g., oxygen ($O_2$) or nitrogen oxide ($NO_2$), and tuning the graphene-metal interaction by interfacial reaction of the ambient gas with the surface of the metal. The step of tuning the graphene-metal interface can be achieved by regulating surface exposure of the transition metal to ambient gas. In one embodiment, the ambient gas molecules adsorb on the surface of the metal at temperatures below 400° C., and preferably between 20° C. and 400° C., which in turn decouples the graphene from the metal. In this embodiment, the ambient gas, such as oxygen, does not etch the graphene but selectively adsorbs on the metal surface beneath the graphene sheet. The complete intercalation of macroscopic domains that are tens of micrometers in size decouples the graphene and restores the linear $\pi$ bands of its electronic structure. The graphene sheet is not merely a passive spectator in this process, but its presence affects the metal-adsorbate interaction. In this embodiment, the intrinsic bonding strength of an adsorbate on the clean metal surface can be modified by partially covering the metal surface with a graphene sheet. In another embodiment, the intercalation can be reversed by raising the system to a temperature above 400° C., preferably above 450° C. and below the melting temperature of the transition metal, e.g., Ru~2334° C.

Another aspect is the novel functionality of the confined space between the metal surface and the graphene sheet that is conducive to controlled chemical reactions. The functionality stems from a steric hindrance (~3.3 Å) between the graphene sheet and the surface of the metal. Specifically, the steric hindrance limits access of undesirable atomic and molecular species, especially larger molecules, and controls the orientation of desirable molecular species, which in turn has an effect on the reaction parameters, such as adsorption energies and can induce the selective bonding and reaction of properly oriented molecular species. In this embodiment, it is possible to perform controlled chemical reactions at the interface with graphene that may be exploited to tune chemical and catalytic reactions or to tune graphene's electronic structure for the fabrication of device elements. In some embodiments construction of interfacial layers may occur by intercalation of reacting species at the interface between graphene and a substrate.

The method of processing graphene further includes providing a graphene layer in which graphene interacts with a surface of a metal substrate under the graphene layer and, the surface of the metal substrate is exposed to a basic aqueous solution. The graphene-substrate interaction is tuned by interfacial reaction of the basic aqueous solution on the surface of the metal surface, and the basic aqueous solution is intercalated between the graphene layer and the surface of the metal substrate as part of a working electrode in an electrochemical cell. The graphene-substrate interaction is modified or the graphene is decoupled from the metal substrate as a result of the basic aqueous solution intercalation.

These and other characteristics will become more apparent from the following description and illustrative embodiments which are described in detail with reference to the accompanying drawings. Similar elements in each figure are designated by like reference numbers and, hence, subsequent detailed descriptions thereof may be omitted for brevity.

DETAILED DESCRIPTION

Figure 1A:
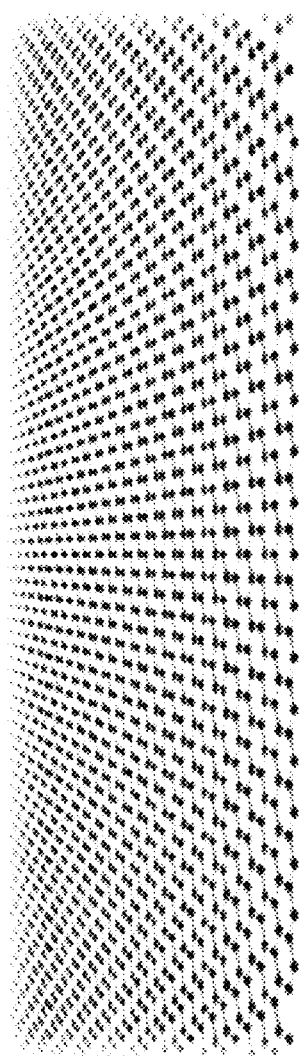
FIGS. 1A-1D show (A) a 2D graphene sheet that can be formed into (B) 0D buckyballs, e.g., $C_{60}$ fullerene, (C) 1D nanotubes, or (D) stacked 3D graphite.
Figure 1B:
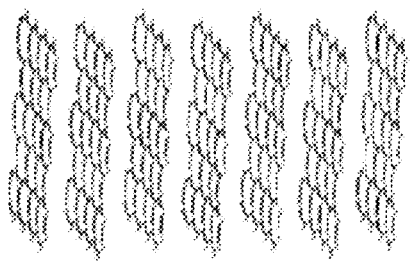
Figure 1C:
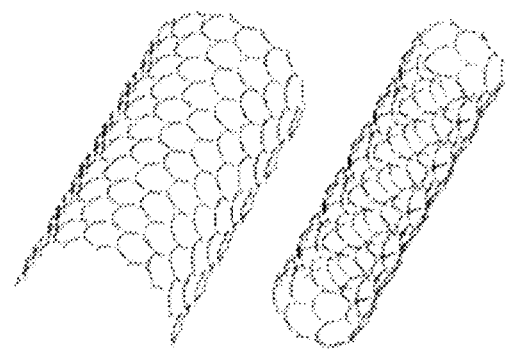
Figure 1D:
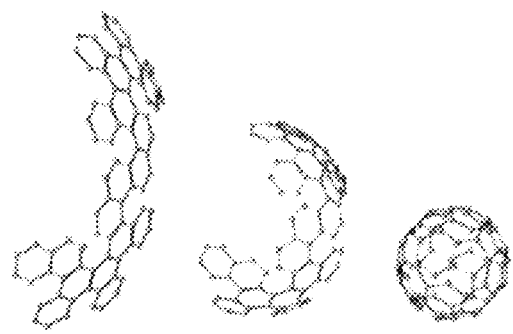

A method of processing graphene is provided by combining atomic and molecular intercalation of different species, e.g., Si, $O_2$, and $NO_2$, in order to liberate a graphene sheet from the strong metal-carbon coupling and, thereby, restore the characteristic Dirac behavior of isolated graphene. The graphene includes monolayer graphene, or has related charge-carrier characteristics of bilayer graphene, few-layer graphene or multilayer graphene.

Such intercalation may generate thin gate insulators beneath graphene and, following suitable lithographic patterning, allows utilization of the underlying metal as source, drain, and gate electrodes in a field-effect device. It is to be understood, however, that those skilled in the art may develop other combinatorial, structural, and functional modifications without significantly departing from the scope of this disclosure.

A method of processing a monolayer graphene includes the steps of growing graphene by epitaxially depositing a layer of carbon based material on a surface of a metal substrate, exposing the surface of the metal substrate under the graphene layer to an ambient gas or other atomic or molecular species, and tuning the graphene-metal substrate interaction by interfacial reaction of the ambient gas or other atomic or molecular species on the surface of the metal substrate. The ambient gas is an atomic gas, a gas of diatomic or larger molecules, or a gas of molecules that break down into atoms or smaller (diatomic or larger) molecules between the graphene layer and the metal substrate surface. Examples of ambient gases include oxygen ($O_2$), nitrogen oxide ($NO_2$), nitrogen ($N_2$), hydrogen ($H_2$), chlorine (Cl), fluorine (F), bromine (Br), iodine (I), and ammonia ($NH_3$). Other species appropriate for intercalation include silicon (Si), boron (B), aluminum (Al), zinc (Zn), chromium (Cr), titanium (Ti), zirconium (Zr), hafnium (Hf), scandium (Sc), yttrium (Y), magnesium (Mg), calcium (Ca), strontium (Sr), barium (Ba), lanthanum (La), cerium (Ce), praseodymium (Pr), neodymium (Nd), promethium (Pm), samarium (Sa), europium (Eu), gadolinium (Gd), terbium (Tb), dysprosium (Dy), holmium (Ho), erbium (Er), thulium (Tm), and ytterbium (Yb).

In the step of growing graphene epitaxially, the metal substrate needs to provide a growth template for the graphene. In one embodiment, the metal substrate includes, but is not limited to, any transition metal or alloy that exhibits a large change in C solubility with changing temperature. Preferably, the transition metal is selected from ruthenium (Ru), nickel (Ni), platinum (Pt), iridium (Ir), copper (Cu), cobalt (Co), iron (Fe), palladium (Pd), and rhodium (Rh), with Ru being preferred. The surface lattice parameter of the transition metal is preferably matched to that of graphene, having a lattice mismatch of ≤15%, or is such that higher order commensurate or incommensurate interface structure develops that still provides a good structural template for graphene growth. The growth surface is not limited to a particular crystallographic plane or surface structure, but preferably exhibits a hexagonal crystal structure, thereby providing a template for graphene growth. Ruthenium (0001) is the most preferred, while the platinum, copper, nickel and iridium (111) faces are also useful. The metal surface preferably consists of atomically smooth terraces alternating with atomic surface steps, so as to permit the facile nucleation and growth of graphene layers followed by growth via C incorporation along the edges of the graphene layer.

The growth process is continuous, such that the graphene layer propagates across terraces and over step edges in the "downhill" direction during growth. Additional C layers may nucleate and grow on top of or beneath the first and/or subsequent layers to produce a plurality of graphene layers sequentially stacked one on top of the other. Once the metal substrate is selected, the surface can be initially cleaned, for example, by repeated cycles of $Ar^+$ ion bombardment and high-temperature annealing in an ultrahigh vacuum (UHV) or high vacuum (HV) process chamber. The growth process further encompasses heating the metal substrate to temperatures between 500° C. and 2000° C. depending on the metal selected, preferably to 700° C. to 1500° C. for several seconds to several minutes and then slowly, e.g., at a rate ≤10° C.-50° C. per minute, cooling to 300° C. to 1000° C., preferably 600° C. to 900° C. while exposing the metal surface to a carbon source, e.g., ethylene.

As the metal surface cools, graphene nucleates at random sites on the surface and the size of the graphene domain increases gradually with decreasing temperature as C atoms are continually incorporated along the edges of the graphene layer. This results in graphene domains with linear dimensions preferably in excess of 200 μm. A detailed description of this process with particular application to Ru(0001) is described in Sutter 2008.

Specifically, if the transition metal substrate is ruthenium (Ru) and the growth plane is the Ru(0001) crystal surface, the Ru(0001) surface is initially cleaned by repeated cycles of alternating oxygen adsorption and high-temperature annealing in an ultrahigh vacuum (UHV) or high vacuum (HV) process chamber, or by longer oxygen exposure at 550° C. to 950° C., followed by oxygen adsorption and flash annealing. This is followed by heating to 950° C. to 1250° C. for several seconds to several minutes while exposing the Ru(0001) to a carbon source, e.g., ethylene (so as to enrich the Ru crystal with interstitial carbon), and then slowly (at a rate ≤20° C. per minute) cooling to 700° C. to 900° C. As the Ru(0001) surface cools, graphene nucleates at random sites on the surface and the size of the graphene domain increases gradually with decreasing temperature as C atoms are continually incorporated along the edges of the graphene layer.

In an alternative, a surface template for graphene growth may be provided by a suitable transition metal or alloy thin film formed on a supporting substrate. The substrate is not limited to any particular material, but must be able to support the transition metal or alloy. That is, the underlying substrate must have physical and chemical properties which facilitate the formation of a suitable transition metal or alloy overlayer which then serves as a surface template for graphene growth. An example is Ru on $SiO_2$ on silicon. (See Sutter, E. A., et al., "Graphene growth on polycrystalline Ru thin films," *Appl. Phys. Lett.*, 95, p. 133109 (2009), which is incorporated by reference herein in its entirety.) Another example is Ru on sapphire ($Al_2O_3$(0001)), which provides particularly well-ordered Ru(0001) template surfaces for high-quality graphene growth (See Sutter, P. W., et al., "Graphene growth on epitaxial Ru thin films on sapphire," *Appl. Phys. Lett.*, 97, p. 213101 (2010), which is incorporated by reference herein in its entirety.)

In some embodiments, the substrate and/or the transition metal or alloy film may deviate from planarity. In some cases, this deviation may be a curvature whose radius is of the order of, or greater than, that of the lateral dimensions of the graphene domains. In other cases, the substrate may exhibit curvature whose radius is significantly smaller than the lateral dimensions of the graphene domains. The substrate curvature may have a radius on the order of 100 μm, or greater or less than that depending on the particular application. An example is a Ru thin film on a patterned, non-planar fused silica substrate. (See Sutter, E. A., et al., "Monolayer graphene as ultimate chemical passivation layer for arbitrarily shaped metal surfaces", *Carbon* 48, p. 4414 (2010), which is incorporated by reference herein in its entirety.)

Figure 5:
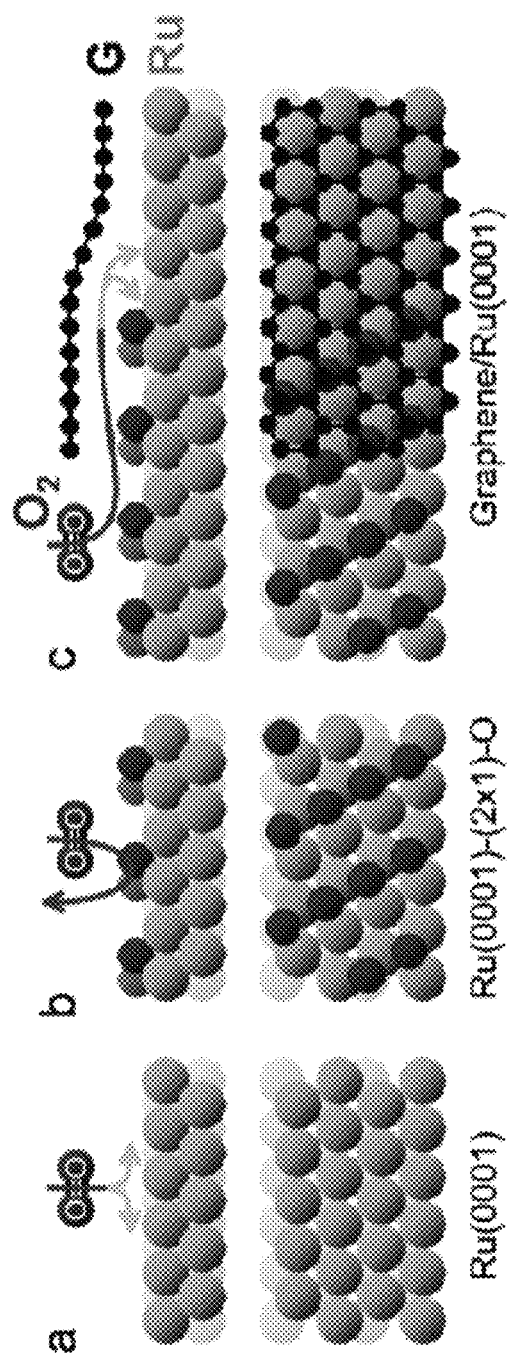
FIG. 5A shows a schematic illustration of chemisorption on the clean Ru surface
FIG. 5B shows a schematic illustration of saturation of the dissociative adsorption at an oxygen coverage of 0.5 ML in an ordered (2×1)-O structure.
FIG. 5C shows a schematic illustration of molecular intercalation of $O_2$ beneath monolayer graphene on Ru, leading to simultaneous graphene-metal decoupling and formation of the (2×1)-O saturation structure.

The method of processing the monolayer graphene further includes steps of exposing the partially-covered surface of the metal, e.g., Ru(0001), Ir(111), Ni(111), Pt(111), or Cu(111), to an ambient gas, e.g., oxygen ($O_2$) or nitrogen oxide ($NO_2$), and tuning the graphene-metal interaction by interfacial reaction of the ambient gas with the surface of the metal beneath the graphene sheet. In particular, the step of exposing can be performed by heating partially graphene-covered metal in an ambient gas, e.g., $O_2$/Argon, flow for a fixed period of time, e.g., 1-24 h. During this step the ambient gas either intercalates beneath the graphene layer or etches the graphene layer depending on the conditions of the exposure. Thus, the step of tuning the graphene-metal interface is achieved by regulating the surface exposure. The ambient gas molecules intercalate on the surface of the metal at temperatures below 400° C., preferably between 200° C. and 380° C., which in turn decouples the graphene from the metal. Under these conditions, the ambient gas is preferably a diatomic molecule, such as oxygen, or a molecule that breaks down into a diatomic molecule, e.g., $NO_2 \rightarrow NO$ (+½O), that does not etch graphene but selectively adsorbs on the metal surface beneath the graphene sheet as illustrated in FIGS. 5A-5C. The complete intercalation of macroscopic domains that are tens of micrometers in size decouples the graphene and restores the linear π bands of its electronic structure. The graphene sheet's presence affects the metal-adsorbate interaction. The intercalation can be reversed and etching increased by raising a temperature above 400° C., although below the melting temperature of the transition metal, e.g., Ru~2334° C., Ni~1455° C., preferably between 400° C. and 800° C. Under elevated temperature, $O_2$ exposure, for example, causes the preferential etching of graphene point defects and edges. These effects become much more pronounced for graphene on metals that facilitate the dissociation of $O_2$, releasing highly reactive oxygen atoms (see FIGS. 2A and 2B).

In another embodiment, the intercalation of species (atoms, molecules) between graphene and metal, and the resulting decoupling of the graphene sheet from the metal, can be accomplished in a liquid solution environment, including basic aqueous solutions of potassium hydroxide (KOH) or sodium hydroxide (NaOH) with typical concentrations between 0.1 molar and 4.0 molar. During the process of intercalation the sample is the working electrode of an electrochemical cell with a suitable (for example Pt) counter electrode, and with an applied working electrode potential between −0.1 V and −10 V relative to the counter electrode. In this process, the graphene surface is typically covered by a polymer layer (for example, poly(methyl methacrylate), PMMA, or a similar polymer that is non-soluble in aqueous environments) that acts as a mechanical support layer and protective surface layer for the decoupled graphene.

In another aspect, the interface of graphene with metals or metal-decorated substrates, such as Ru(0001), is conducive to controlled chemical reactions based on novel functionality of the confined space between a metal surface and a graphene sheet. In one embodiment, the confined space measures about 3.3 Å from the surface of the metal substrate to the graphene layer. This approach contrasts with the long-held notion that graphitic carbon acts as a poison that suppresses desired chemical reactions in surface chemistry and catalysis. However, in the preferred embodiment, the graphene sheet does not merely act as a passive spectator but it provides two types of novel functionality. It generates an extended confined space that can give rise to significant steric hindrance, which should preclude the access of large species and may control the orientation of small molecules. In addition, similar to other strategies, e.g., coadsorption, the presence of the graphene sheet can affect important reaction parameters, such as adsorption energies of molecules adsorbed on the metal beneath graphene. Chemistry at the interface between graphene and the transition metal thus represents a new approach for tuning chemical reactions on transition-metal surfaces.

Figure 10:
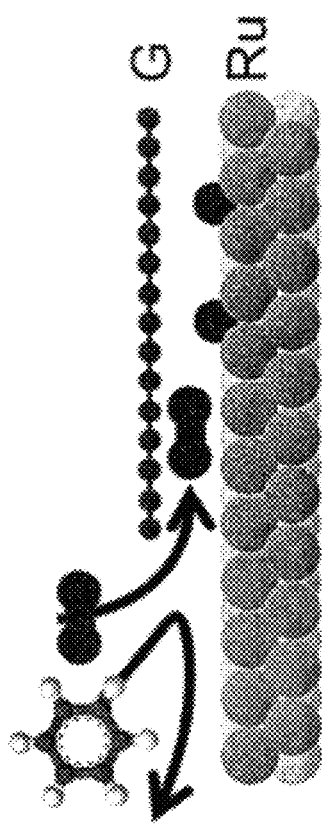
FIG. 10 shows a schematic illustration of size control of chemical reactions at the interface between graphene and a substrate.
Figure 11:
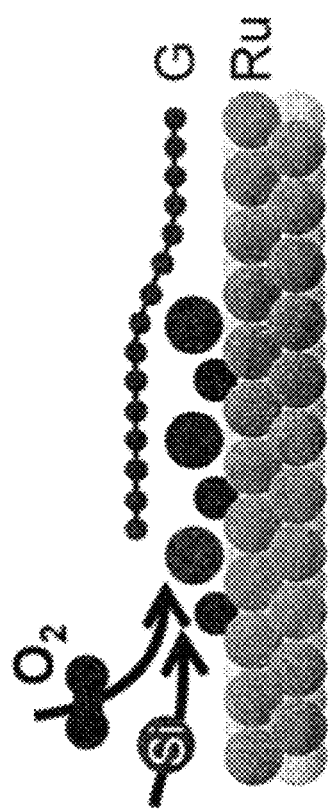
FIG. 11 shows a schematic illustration of interfacial materials synthesis at the interface between graphene and a substrate.

FIG. 10 is a schematic illustration of how the limited distance between a graphene sheet and its substrate, generally 1.8 to 4.0 Å, hinders entry of large molecules while permitting small molecular and atomic species to intercalate. By this means the graphene sheet provides size control for interfacial reactions. FIG. 11 is a schematic illustration of materials synthesis at the interface between graphene and its substrate. The reactant species intercalate between the graphene layer and its substrate, where they react to form a new material. This process could be used, for example, to produce a gate dielectric between the graphene and its substrate, thus isolating graphene electrically from the metal. The metal can then serve as a gate electrode, e.g., in a field-effect device.

While the processing of graphene by reactive intercalation has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

EXAMPLES

The examples set forth below also serve to provide further appreciation of the invention but are not meant in any way to restrict the scope of the described invention.

Example 1

Figure 7:
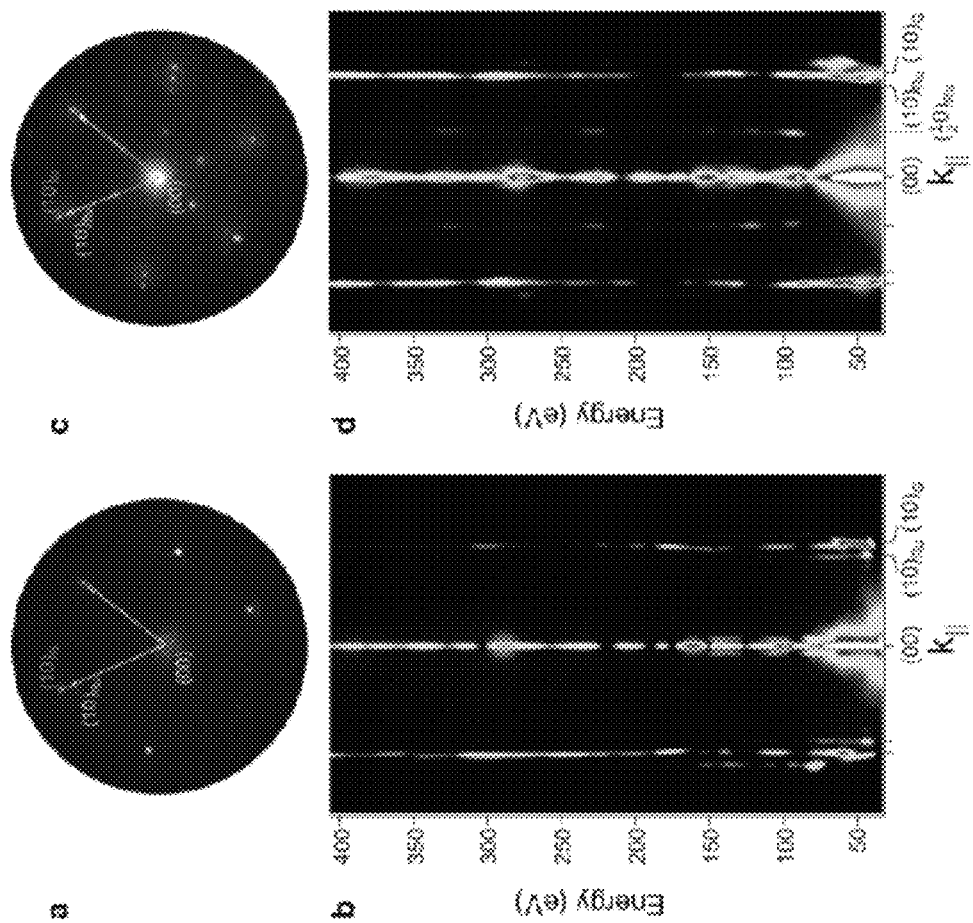
FIG. 7A is a low-energy electron diffraction (LEED) pattern (155 eV) of as-grown monolayer graphene on Ru(0001).
FIG. 7B shows a LEED intensity map as a function of in-plane wavevector, $k_\parallel$ on as-grown monolayer graphene on Ru(0001)
FIG. 7C is a LEED pattern (155 eV) of oxygen-($O_2$—) intercalated monolayer graphene on Ru(0001).
FIG. 7D is a ($k_\parallel$, E)-dependent diffraction intensity map for $O_2$-intercalated monolayer graphene, showing the formation of an ordered (2×1)-O superstructure.

Graphene epitaxy was performed in ultrahigh vacuum (UHV) by carbon segregation from a Ru(0001) single crystal pre-exposed to ethylene at a temperature of 1,150° C., as described in Sutter 2008. Specifically, graphene growth was carried out by thermal cycling of a Ru(0001) single crystal in UHV to achieve the controlled layer-by-layer growth of large graphene domains on Ru(0001). At high temperature, C was absorbed into the Ru bulk. Slow cooling from 1,150° C. to 825° C. lowered the interstitial C solubility by a factor of 6, driving significant amounts of C to the surface. The result was an array of lens-shaped islands of macroscopic size (>100 μm) covering the entire Ru(0001) substrate, as shown in FIG. 7A, which is a LEED pattern (155 eV) of the as-grown monolayer graphene on Ru(0001).

Example 2

Graphene growth and intercalation were observed in real time by bright-field low-energy electron microscopy (LEEM), using an Elmitec LEEM V field emission microscope.

Figure 2:
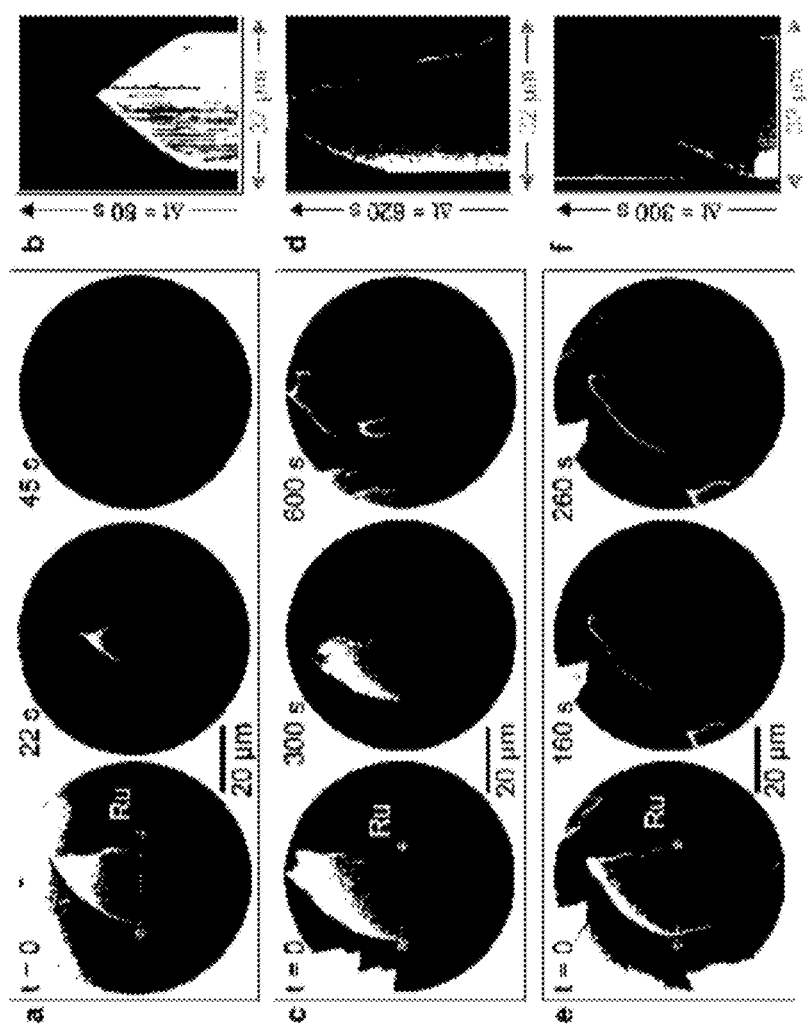
FIG. 2A is a sequence of LEEM images obtained during high-temperature $O_2$ exposure, showing oxygen etching of a graphene domain (P=5×10$^{-7}$ Torr; T=550° C.).
FIG. 2B is a time-dependent image intensity [I(x, t)] map along the line marked in FIG. 2A.
FIG. 2C is a sequence of LEEM images obtained during low-temperature $O_2$ exposure, giving rise to oxygen intercalation and selective oxidation of the Ru surface beneath graphene (P=5×10$^{-7}$ Torr; T=340° C.), leaving the graphene intact.
FIG. 2D is a time-dependent image intensity [I(x, t)] map along the line marked in FIG. 2C.
FIG. 2E is a sequence of LEEM images obtained during low-temperature $NO_2$ exposure (P=2×10$^{-7}$ Torr; T=340° C.).
FIG. 2F is a time-dependent image intensity [I(x, t)] map along the line marked in FIG. 2E.

FIG. 2A is a sequence of real-time LEEM images of epitaxial monolayer graphene on Ru(0001) obtained during $O_2$ exposure above 450° C., showing oxygen etching of a graphene domain (P=5×10$^{-7}$ Torr; T=550° C.). At high temperatures, $O_2$ exposure causes the preferential etching of graphene at point defects and edges. These effects became much more pronounced for graphene on metals that facilitate the dissociation of $O_2$, releasing highly reactive oxygen atoms. As illustrated in FIGS. 2A and 2B, an initial drop in image intensity within areas of exposed metal that accompanies the adsorption of oxygen on the metal surface is followed by rapid etching of the graphene edge. The resulting reverse edge-flow continues until no detectable graphene remains on the surface.

Example 3

FIG. 2C is a sequence of LEEM images of epitaxial monolayer graphene on Ru(0001) obtained during $O_2$ exposure below 400° C., giving rise to oxygen intercalation and selective oxidation of the Ru surface beneath graphene. As illustrated in FIGS. 2C and 2D, when similar graphene domains as described in Example 2 are exposed to $O_2$ at lower temperatures, the initial oxygen adsorption on the exposed metal is again followed by changes in image contrast that begin near the edge and extend progressively toward the center of the graphene domain. Throughout this process, however, the modified graphene sheet remains clearly distinguishable from the surrounding metal surface.

While oxygen intercalation during $O_2$ exposure of graphene on Ru(0001) has been postulated in Zhang, H. et al. (*J. Phys. Chem. C* 2009, 113, 8296, incorporated herein by reference in its entirety) on the basis of small-scale scanning tunneling microscopy (STM) combined with photoelectron spectroscopy, the LEEM images in FIGS. 2C and 2D illustrate that such intercalation is readily scaled up to modify the graphene-Ru interface over macroscopic areas. The front between as-grown and modified graphene is sharply delineated throughout this process, and high-resolution STM shows it to be abrupt on the atomic scale as illustrated in a low-bias scanning tunneling microscopy image of the boundary between as-grown and oxygen intercalated graphene on Ru(0001) shown in FIG. 6. As illustrated in FIG. 2C, for the lens-shaped monolayer graphene domains on Ru, the intercalation proceeds readily from the straight edge and across substrate steps in the downhill direction but is often hindered at the opposite (rounded) edge of the domain.

Furthermore, FIG. 7A is a LEED pattern (155 eV) of as-grown monolayer graphene on Ru(0001) and FIG. 7C illustrates the same but with oxygen ($O_2$) intercalated beneath monolayer graphene on Ru(0001). Accordingly, FIGS. 7B and 7D illustrate that electron microdiffraction on either side of the intercalation front has a transition from the well-known graphene-Ru(0001) Moiré to a structure with additional half-integer diffraction spots, identified as an ordered p(2×1) adlayer phase with 0.5 monolayer (ML) of oxygen chemisorbed on the Ru surface beneath the graphene sheet.

Example 4

Exposure to a different oxygen precursor, $NO_2$, at the same temperature, as provided in Examples 3, induces similar behavior, namely, the selective modification of the epitaxial graphene monolayer by intercalation. FIG. 2E is a sequence of LEEM images of epitaxial monolayer graphene on Ru(0001) obtained during $NO_2$ exposure below 400° C., giving rise to nitrogen monoxide intercalation and selective oxidation of the Ru surface beneath graphene. As illustrated in FIGS. 2C-2F, overall, the intercalation by exposure to $NO_2$ proceeds substantially faster than that from $O_2$. It advances uniformly from all edges of the graphene domain. In contrast to the case of $O_2$, the intercalation front is only initially abrupt and then becomes progressively more diffuse as it propagates from the edge toward the center of the domain.

Example 5

Figure 3:
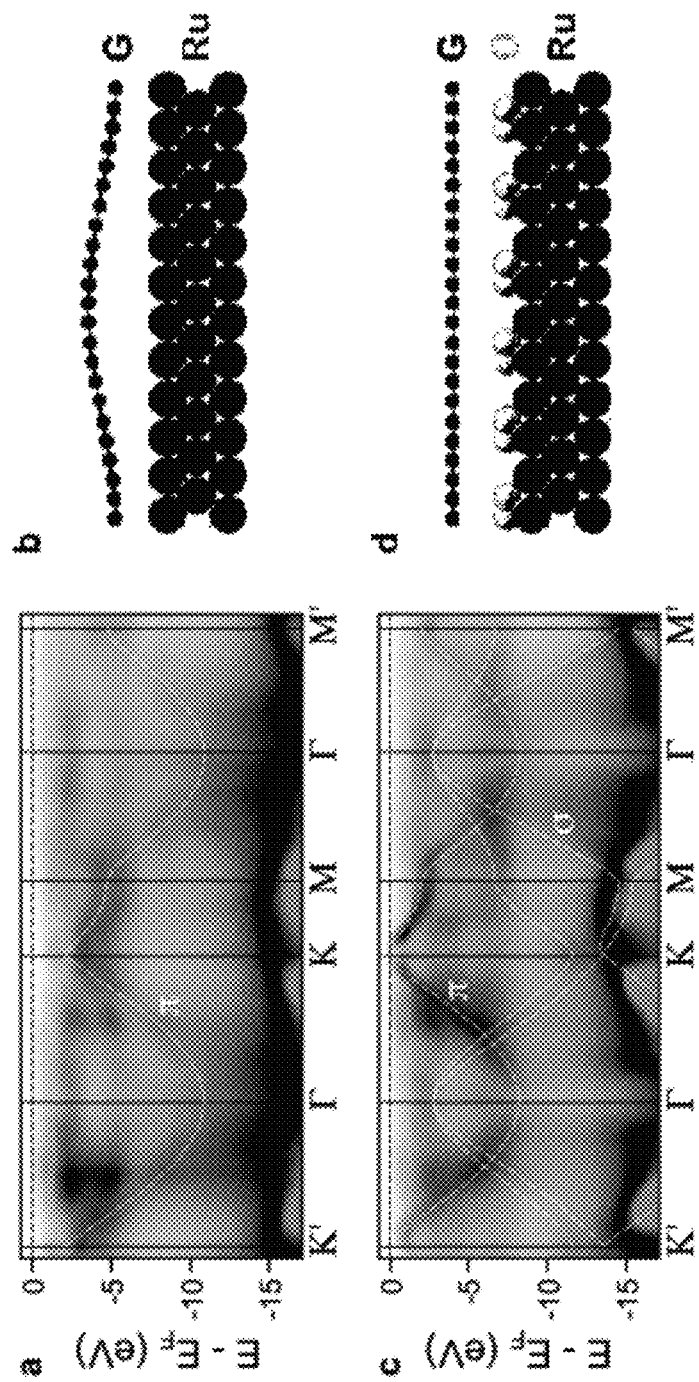
FIG. 3A is a micrometer-sized spot angle-resolved photoelectron spectroscopy (micro-ARPES) map of the band structure of as-grown monolayer graphene on Ru(0001), reflecting the strong coupling between graphene and Ru by hybridization of graphene's electronic structure with metal d states.
FIG. 3B is a schematic of the corrugated Moiré structure of graphene on Ru(0001) with alternating strong and weak coupling between graphene and Ru corresponding to FIG. 3A.
FIG. 3C is a micro-ARPES map of the band structure of the graphene sample of FIG. 3A after exposure to $O_2$, showing the restoration of linear π bands crossing the Fermi energy ($E_F$) and hole doping of the graphene with a charge-neutrality point 0.5 eV above $E_F$.
FIG. 3D is a schematic of the decoupled, planar graphene sheet over an ordered Ru(0001)-(2×1)-O structure.

Measurements of the projected band structure provide direct evidence of the dramatic change in the interfacial coupling between graphene and metal caused by the processes shown in FIGS. 2C-2F. FIGS. 3A and 3C are micrometer-sized spot angle-resolved photoemission spectroscopy (micro-ARPES) maps of the band structure of as-grown monolayer graphene on Ru(0001) before and after $O_2$ exposure, showing the restoration of linear π bands crossing the Fermi energy and hole doping with a charge-neutrality point 0.5 eV above the Fermi energy, $E_F$. As illustrated in FIG. 3A, for as-grown monolayer graphene on Ru(0001), metal d states hybridize with the occupied graphene π orbitals. This strong electronic interaction is reflected by a pronounced (2 eV) downward shift of the π bands and the opening of a gap between the π and π* states near $E_F$. In contrast, $O_2$ (or $NO_2$) exposure at temperatures of 300° C. fundamentally alters the electronic band structure illustrated in FIG. 3C. In the modified graphene domains, the π-d hybridization is lifted (see FIGS. 3B and 3D), leading to the appearance of well-defined graphene π bands crossing the Fermi level with linear band dispersion at the (K, K') points of the Brillouin zone. The observed intense π bands and the weaker σ bands closely match the band structure of free-standing graphene.

Example 6

Figure 6:
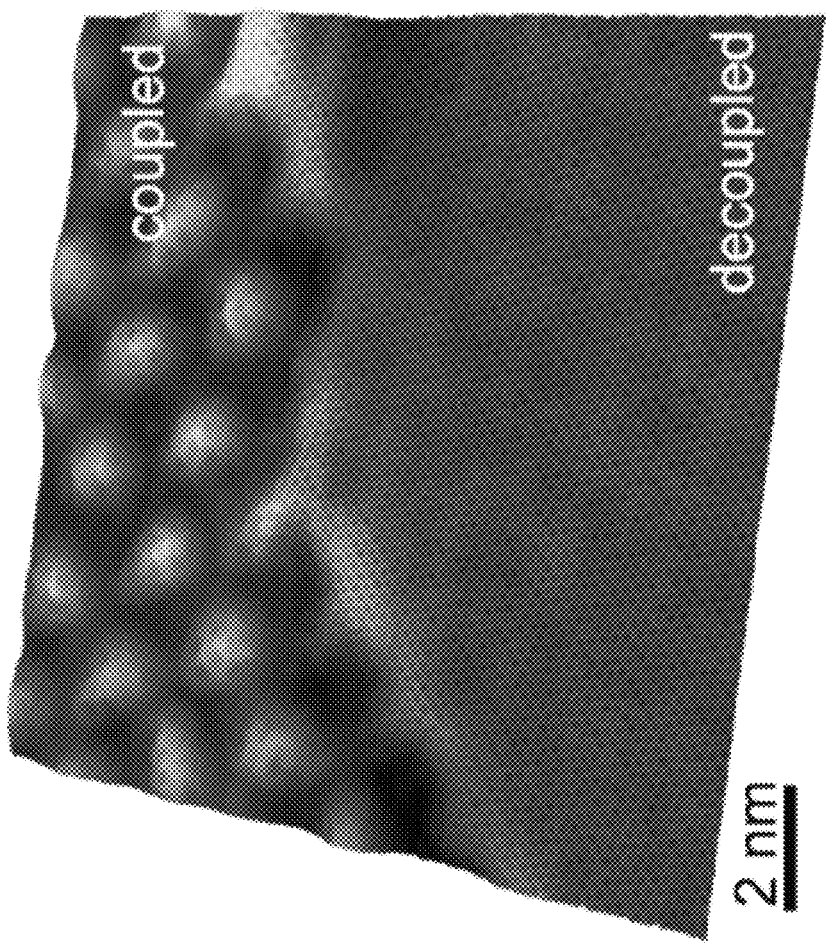
FIG. 6 is a low-bias scanning tunneling microscopy image of the boundary between as-grown and oxygen-intercalated graphene on Ru(0001), illustrating the elimination of the corrugated moiré structure to form a planar, graphene layer that is decoupled from the metal.

Charge transfer shifts the neutrality point ("Dirac point") to 0.5 eV above $E_F$, thereby inducing a net hole doping of the graphene sheet. The oxygen exposure also affects the (0001) projected band structure of Ru, notably at the zone center, where the occupied band at −2 eV is strongly modified, consistent with O chemisorption on the metal surface beneath the graphene sheet. The formation of a strongly bound, ordered oxygen adlayer structure causes the coupling of Ru 4d with O 2p states. This saturates the metal d states and weakens the interaction with graphene, which is now limited to residual electron transfer from the graphene sheet to the strong acceptors at the metal surface. The STM contrast changes across the intercalation boundary, a sharp transition from a strongly corrugated moiré to a planar sheet with honeycomb structure similar to that found for free-standing graphene, as shown in FIG. 6.

Example 7

Additional experiments were performed to address the kinetics of oxygen intercalation and graphene etching as well as the reaction mechanism for Ru oxidation beneath monolayer graphene. Surface structure of the graphene-Ru was determined in situ by low-energy diffraction (LEED) and IV-LEED in the same system. Temperature dependent graphene intercalation and etching rates were extracted from the motion of the intercalation front. Band structure [$E(k_x,k_y)$] maps on as-grown and intercalated graphene were obtained at room temperature in-situ in an energy-filtered LEEM III instrument by collecting angle resolved photoelectron spectra from micrometer-sized sample areas (micro-ARPES). Synchrotron ultraviolet radiation (National Synchrotron Light Source beamline U5UA; photon energy hv=42 eV) incident normal to the sample was used to excite photoelectrons, which were energy filtered by an imaging energy analyzer (energy resolution <0.3 eV), and whose angular distribution was mapped in reciprocal space using the electron optics and detector system of the microscope. Scanning tunneling microscopy (STM) of the graphene intercalation edge was performed at room temperature in situ in a separate UHV system, using the procedures outlined above for graphene growth and oxygen intercalation. UHV-SEM imaging and nano-Auger electron spectroscopy were performed in a commercial system (Omicron Nanotechnology) equipped with a field-emission SEM and Auger electron analyzer, using the focused SEM electron beam (energy: 3 keV; current: 100 pA) to excite Auger electrons.

Figure 4:
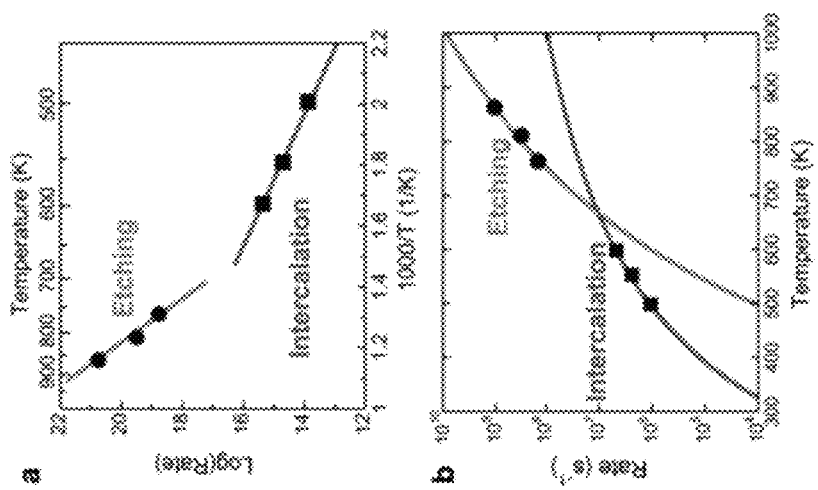
FIG. 4A is an Arrhenius plot showing different activation energies for intercalation (0.38 eV) and etching (1.1 eV).
FIG. 4B shows derived net reaction rates for etching and intercalation, illustrating the branching into two distinct regimes at low and high temperatures.

Real-time LEEM observations during $O_2$ exposure at different temperatures were used to analyze the competition between intercalation (leading to the selective oxidation of Ru beneath the graphene sheet) and etching of graphene. The results are summarized in FIGS. 4A-4B, showing that the two processes are thermally activated but follow distinctly different Arrhenius relations.

The overall reaction rates can be written as $$R = fA\exp(-E_A/k_B T),$$

where A is the attempt frequency of the rate-determining step, f is an "efficiency factor" involving the abundance of the reactant ($O_2$), and $E_A$ and $k_B T$ denote the activation barrier and thermal energy, respectively. A fit of this relation to the measured reaction rates gives $E_A$ and the prefactor, fA. For oxygen intercalation, $E_A$=0.38±0.05 eV (see FIG. 4A). A small prefactor, $fA=10^{10}$ $s^{-1}$, indicates a low concentration of mobile species arriving at the reaction front. Oxygen etching of the graphene domain involves a larger activation energy, $E_A$=1.1±0.1 eV, so it should generally proceed with a lower rate than intercalation. However, the prefactor for oxidative attack ($3\times10^{15}$ $s^{-1}$) is much larger than for oxygen intercalation, reflecting the unrestricted access of reactants (O, $O_2$) from the exposed metal to the graphene edge. The overall result of these complex reaction kinetics is a competition between the two processes: intercalation dominates at low temperatures, and a transition to etching occurs for higher temperatures (see FIG. 4B).

Example 8

Figure 9:
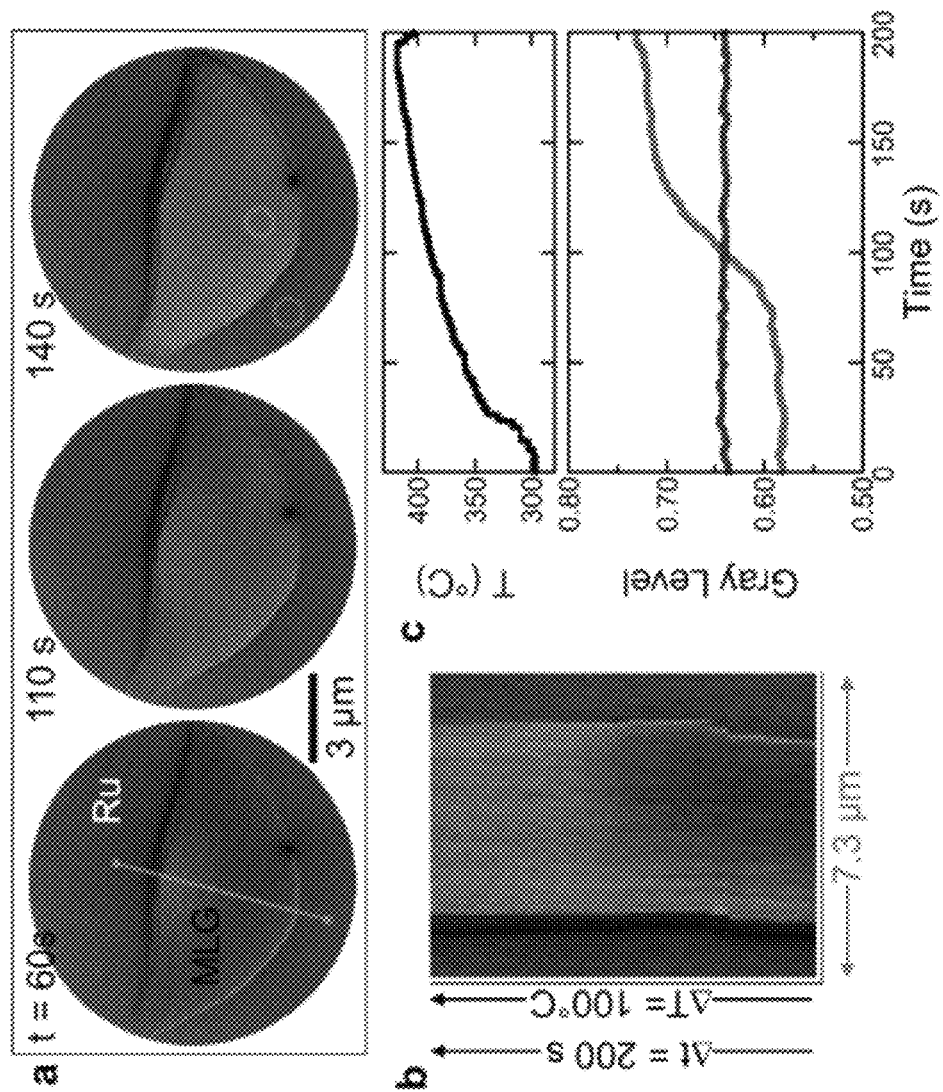
FIG. 9A is a series of LEEM images of an initially fully $O_2$-intercalated monolayer graphene domain, at different stages of annealing to a peak temperature of ~400° C. (temperature profile shown in FIG. 9C).
FIG. 9B is a time-dependent image intensity [I(x, t)] map along the line marked in FIG. 9A.
FIG. 9C is a graph showing the annealing temperature profile and time-dependent LEEM image contrast at the points on the free metal surface and within the graphene domain, marked in FIG. 9A.

The observed partitioning into two distinct regimes shown in Example 7 suggests that intercalated graphene should remain stable to temperatures of at least 400° C. Real-time LEEM during annealing shown in FIG. 9A can thus be used to explore the stability of the interfacial oxygen layer and the reversibility of the intercalation process. As illustrated in FIG. 9C, heating from the intercalation temperature to 400° C. causes no changes in the contrast of the free Ru surface, consistent with a high O binding energy. The contrast of the intercalated graphene domain, on the other hand, changes progressively above an onset temperature of 380° C., reverting from the dark contrast of an intercalated domain to the characteristic bright appearance of as-grown monolayer graphene. On the basis of these observations, it is concluded that oxygen intercalation is reversible. The presence of graphene affects the binding of oxygen on Ru(0001), weakening the coupling so desorption can occur at temperatures at which O remains strongly bound on the free metal surface.

A comparison of the effects of two different oxygen-carrying precursors, $O_2$ and $NO_2$, is an important element to shed light on the mechanism of selective Ru oxidation beneath graphene at low temperatures. $O_2$ adsorption on bare Ru(0001) is dissociative, initially with a sticking coefficient near unity. At the $O_2$ pressures used in Examples 1-8, it gives rise to a progression of ordered O-adlayer structures, terminating in a p(2×1)-O structure at 0.5 ML coverage. At this point, the $O_2$ sticking coefficient drops sharply, causing an apparent saturation of adsorption. Higher doses do not lead to the continued release of O atoms, but the "excess" $O_2$ simply desorbs. $NO_2$ adsorption at elevated temperatures, on the other hand, involves the dissociation to atomic oxygen and NO. The chemisorbed O again forms ordered adlayers, albeit to coverages up to 1 ML. NO desorbs from the free Ru surface at the temperatures considered here. For Ru(0001) partially covered by monolayer graphene, $O_2$ exposure at elevated temperatures leads to dissociative adsorption of oxygen on the exposed Ru surface but not on the graphene. Adsorbed O atoms diffuse on Ru(0001), so they can reach the graphene edge and start to decouple the graphene from the metal surface. This process of $O_2$ dissociation on free Ru and intercalation by O diffusion into areas beneath the graphene domain could in principle continue until the entire graphene sheet is decoupled. If this is the case, the kinetics of O-diffusion on graphene-covered Ru must differ substantially from that on free Ru(0001).

The Arrhenius analysis, provided in Example 7, showed that for graphene intercalation, the activation energy for the reaction-limiting step is $E_A=0.38$ eV, which is substantially lower than the measured and calculated O diffusion barrier on Ru (0.5-0.7 eV). The atomically abrupt intercalation front suggests that the limiting step occurs at the front itself and thus is the decoupling of carbon from the metal. Hence, the diffusion of the intercalating species to the reaction front cannot be the limiting step but must be fast with an activation energy below 0.38 eV. The de-intercalation experiments indeed show that the presence of graphene weakens the binding of chemisorbed O on Ru(0001), which means that it could similarly reduce the activation energy for O diffusion at the graphene-Ru interface since the diffusion barrier on transition metals scales linearly with adsorbate binding energy.

Without being bound by theory, a second possible scenario that may explain the facile oxygen transport between monolayer graphene and Ru is the interfacial diffusion that could involve a mobile species different from chemisorbed O. Molecular $O_2$, which is weakly bound to the metal, can be expected to diffuse laterally without significant activation barriers (see FIG. 5C). While on the free Ru surface $O_2$ either dissociates or desorbs (see FIGS. 5A and 5B), in the presence of a partially detached graphene sheet that is itself impenetrable to oxygen molecules, the possibility arises that $O_2$ molecules populate the space between Ru and graphene, diffuse to the reaction front, and dissociate there to drive the continued oxidation of the Ru surface and decoupling of the graphene sheet as illustrated in FIG. 5C.

The suggested diffusion of $O_2$ between the decoupled graphene and the adjacent metal implies that a broader range of chemical reactions involving small molecules could be performed in the confined space between graphene and a metal surface. Comparing the O van der Waals radius (1.52 Å) and the $O_2$ bond length (1.21 Å) with the graphene-metal spacing (3.3 Å, typical for weakly coupled graphene on metal) indicates that molecular intercalation is indeed plausible.

Figure 8:
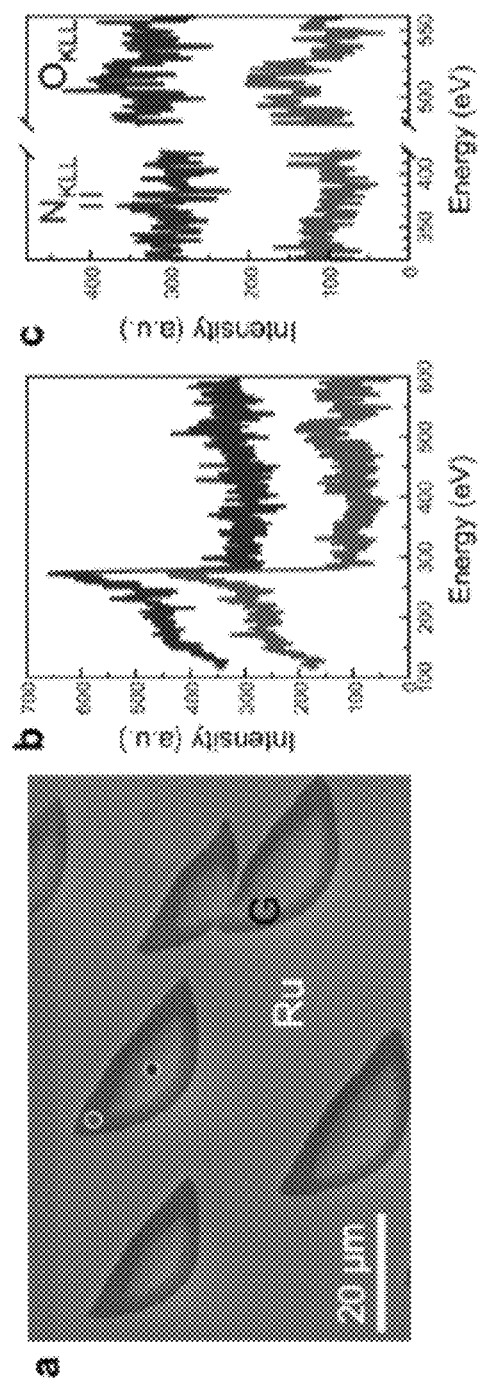
FIG. 8A is a UHV scanning electron microscopy image showing lens-shaped monolayer graphene domains on Ru(0001) after full intercalation by exposure to nitrogen dioxide ($NO_2$) at 300° C.
FIG. 8B is a graph of UHV nano-Auger electron spectra obtained at points near the center and the periphery of a graphene domain, marked in FIG. 8A.
FIG. 8C is a graph of nitrogen and oxygen KLL Auger lines, showing both N and O at the center of the graphene domain (upper spectrum), but only O near the periphery (lower spectrum).

To further corroborate the possibility of intercalation by diatomic molecules, the intercalation by $NO_2$ exposure was considered. Following the initial exposure to $NO_2$, which causes O adsorption and starts decoupling of the graphene, it again becomes possible for NO molecules to be trapped between graphene and the metal. The activation energy for NO diffusion on Ru(0001) (0.16 eV) is significantly lower than those of the other possible dissociation products (N, 0.94 eV; O, 0.5-0.7 eV), so trapped NO could rapidly diffuse to the intercalation front and may become the active species controlling the subsequent decoupling of the graphene sheet. Without being bound by theory, it is anticipated that the presence of nitrogen beneath the graphene sheet would serve as a fingerprint corroborating molecular intercalation. To detect possible N species, ultrahigh-vacuum scanning electron microscopy (UHV-SEM) coupled with nano-Auger electron spectroscopy (nano-AES) was performed and is summarized in FIGS. 8A-8C. UHV-SEM clearly identified the monolayer graphene domains by their characteristic lens shape. While as-grown graphene has a uniform UHV-SEM contrast, graphene domains intercalated from $NO_2$ show a dark rim surrounding a bright central area. Nano-AES detected oxygen ($O_{KLL}$) in both regions. There was no detectable $N_{KLL}$ signal in the darker boundary region, but the central brighter area gave rise to additional $N_{KLL}$ lines. Both the core-shell structure of the intercalated graphene domains and the presence of N in the central region are consistent with the intercalation behavior shown in FIGS. 2E-2F and the suggested scenario of a transition from atomic O to molecular NO intercalation during $NO_2$ exposure. Diatomic molecules such as $O_2$ or NO can therefore populate the space between weakly coupled graphene and metal and as rapidly diffusing species contribute to the continued decoupling of the graphene sheet as illustrated in FIGS. 5A-5C.

All publications and patents mentioned in the above specification are herein incorporated by reference in their entireties. Various modifications and variations of the described materials and methods will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using the teaching herein and no more than routine experimentation, many equivalents to the specific embodiments of the invention described herein. Such equivalents are intended to be encompassed by the following claims.

The invention claimed is:
1. A method of processing graphene, the method comprising,
 providing a graphene layer in which graphene interacts with a surface of a metal substrate under the graphene layer;
 exposing the surface of the metal substrate to a basic aqueous solution;

tuning the graphene-substrate interaction by interfacial reaction of the basic aqueous solution on the surface of the metal surface;

intercalating the basic aqueous solution between the graphene layer and the surface of the metal substrate as part of a working electrode in an electrochemical cell; and modifying the graphene-substrate interaction or decoupling the graphene from the metal substrate as a result of the basic aqueous solution intercalation.

2. The method of claim 1, wherein the metal substrate is selected from the group consisting of ruthenium (Ru), nickel (Ni), platinum (Pt), iridium (Ir), copper (Cu), cobalt (Co), iron (Fe), Palladium (Pd), and rhodium (Rh).

3. The method of claim 1, wherein the basic aqueous solution comprises potassium hydroxide (KOH), sodium hydroxide (NaOH), or a combination of both.

4. The method of claim 3, wherein the basic aqueous solution has a base concentration of between about 0.1 M and about 4 M.

5. The method of claim 1, wherein the electrochemical cell further comprises a counter electrode, and wherein the electrochemical cell applies a working electrode potential between about −0.1 V and about −10 V relative to the counter electrode.

6. The method of claim 1, wherein the graphene layer is covered by a mechanical support layer.

7. The method of claim 6, wherein the mechanical support layer comprises a polymer.

8. The method of claim 7, wherein the polymer comprises poly(methyl methacrylate).

* * * * *